United States Patent [19]

LeJeune

[11] Patent Number: 4,736,297

[45] Date of Patent: Apr. 5, 1988

[54] CONTINUOUS REAL TIME DRILLING PENETRATION RATE RECORDER

[76] Inventor: Donald LeJeune, 212 Vancouver, Lafayette, La. 70501

[21] Appl. No.: 837,149

[22] Filed: Mar. 7, 1986

Related U.S. Application Data

[63] Continuation of Ser. No. 469,260, Feb. 24, 1983, abandoned.

[51] Int. Cl.[4] ............................................. E21B 45/00
[52] U.S. Cl. .................................... 364/420; 73/151.5
[58] Field of Search ...................... 364/420, 421, 422; 73/151, 151.5, 152

[56] References Cited

U.S. PATENT DOCUMENTS

| | | | |
|---|---|---|---|
| 2,494,092 | 1/1950 | Hayward | 364/422 |
| 2,688,871 | 9/1954 | Lubinski | 73/151.5 |
| 3,746,102 | 7/1973 | Griffin, III et al. | 175/27 X |
| 3,824,533 | 7/1974 | Adamson | 364/422 |
| 4,099,410 | 7/1978 | Martin | 73/151.5 |
| 4,156,467 | 5/1979 | Patton et al. | 73/151.5 X |
| 4,165,789 | 8/1979 | Rogers | 175/27 |
| 4,282,523 | 8/1981 | Youmans | 73/151.5 X |
| 4,334,217 | 6/1982 | Nield et al. | 340/685 |
| 4,367,477 | 1/1983 | Dower | 73/151.5 X |
| 4,387,774 | 6/1983 | Herbert | 73/151 X |
| 4,389,885 | 6/1983 | Martin | 73/151.5 |
| 4,393,485 | 7/1983 | Redden | 73/151 |
| 4,419,886 | 12/1983 | Peterson | 73/151.5 |
| 4,459,752 | 7/1984 | Babcock | 73/151.5 |
| 4,616,321 | 10/1986 | Chan | 364/422 |

*Primary Examiner*—Jerry Smith
*Assistant Examiner*—Clark A. Jablon
*Attorney, Agent, or Firm*—William David Kiesel; Robert C. Tucker

[57] ABSTRACT

An apparatus for providing a real-time monitoring and readout of the drilling progress of a rotary drilled deep well or oil well is connected to the wire of a standard wire line measurement wire and monitors the length paid out as a drill string descends. Simultaneously the device monitors the drill operator's controls to detect the status of drill operation. Through a computer driving both a visual and a hardcopy graphic display the operation is provided with a real-time indication of the rate of drill penetration and the rate of change of the drill penetration rate, thus providing direct information as to passage through various strata. A preferred embodiment uses a cam equipped idler wheel to measure movement of the wire line, and monitors the drill operators control switch to detect drill operation. A computer creates a video readout on a standard CRT and a tracking graph on a chart recorder.

4 Claims, 3 Drawing Sheets

CONTINUOUS REAL TIME DRILLING PENETRATION RATE RECORDER

This is a continuation of co-pending application Ser. No. 469,260 filed on Feb. 24, 1983, now abandoned.

BACKGROUND OF THE INVENTION

Within the context of oil well drilling operations, there presently exists many devices and methods for determining the composition of the geological formation being drilled. The following delineated examples of these devices and systems are representative of the relevant prior art:

1. Running gamma ray and/or beta ray transmitters, or the like downhole, by means of wireline apparatus, and utilizing this transmitter to transmit gamma and/or beta rays through the formation, wherein these rays are reflected by the formation back to the transmitter, which further comprises detector means for receiving these reflected gamma and/or beta rays, and measuring and recording these signals by means of a measurer/recorder device situated on the rig floor, which data is interpreted by a skilled log analyst situated thereat. It is important to note that to conduct this measurement of the resistance of the formation to the rays requires that all drilling be stopped, thus resulting in rig downtime, which is very expensive and inefficient. It should also be noted that the density of the formation is inversely proportional to the degree of penetration of the gamma or beta rays within the formation, as the densest formation provides the greatest resistance to the gamma or beta rays being penetrated through the formation. The measurer/recorder device continuously records the degree of penetration of the gamma or beta rays in graphical form, so that the resistance of the rock formation, and therefore the compositon of the rock formation, can be determined by the skilled log analyst who interprets the data at the rig floor;

2. A spontaneous potential curve generator device which transmits an electrical signal from the surface of the formation through the various strata of the formation, to any desired depth and back to the surface of the earth, wherein the device measures the potential across the formation, and generates a spontaneous potential curve which is a graphical representation of the potential which exists across each preselected interval of the formation, for example, every ten feet thereof. The degree of the potential applied thereacross varies with the different types of geological rock formations, or strata, thus enabling a skilled person to interpret this graphical data and determine the type and quality of the formation being drilled downthrough. It is important to note that the operation of the spontaneous potential curve generator also requires that all drilling be stopped, thereby resulting in rig downtime, thereby resulting in great expense and inefficiency in the oil rig operations;

3. The third method of determining the composition of the rock formation being drilled through is by having a skilled mud logging engineer take actual samples of the cuttings or shavings which are present in the drilling mud being circulated through the well bore, as they are recirculated through the well bore to the surface of the well, and by having said mud logging engineer estimate the amount of sand and/or other substances that are in the effluent, and by plotting a graph of the amount of said sand or other substances contained by the drilling mud providing and indication of what type of rock formation is being drilled through, for example, sandstone, shale, etc., and further, providing an indication of the amount of oil and/or gas contained by the formation. It is important to note that this system involves the possibility of much human error, and is extremely limited in its real-time accuracy, and is not an independent method of determination of the composition of the formation, generally;

4. The closest prior art, in terms of similarity to the present invention, is the electro-mechanical or computer-driven devices of the prior art, which basically comprise an enclosure, suitably mounted to the floor of the oil rig, which contains a rotating drum therewithin, wherein the rotating drum is operatively connected to a rotating reel which carries wire which is fed over a pulley wheel disposed above the kelly and over this pulley down to the top of the swivel. In operation, as the wire is unreeled from said reel, it actuates a suitable marking device, for example, a pen for every foot of penetration or downward movement of the kelly, and therefore the drill string and drill bit attached thereto, wherein the marking pen plots a graph on a sheet of graph paper mounted on the rotating drum. The resultant graph depicts the rate of penetration of the drill bit at various depths of the formation, and this data can be interpreted to form the basis for making a determination of the composition or type and quality of the formation being drilled. Generally, the denser the formation, the slower the rate of the penetration of the drill bit therethrough. However, many deficiencies in this system have made it largely inaccurate and difficult to interpret, inter alia, as will be hereinafter thoroughly discussed.

The system of the present invention features many improvements and advantages over all of these above-delineated systems of the prior art. The system of the present invention comprises a top-surface (i.e. mounted to the rig floor) measuring wheel which transmits an electical signal for each pre-determined penetration of the kelly, and therefore, the drill pipe and drill bit attached to the bottom thereto for drilling the well bore, and this electrical signal is shaped/filtered by an electronic circuit which is interfaced with a small computer, thereby transmitting the signal to the computer which is programmed to process this analog like signal into digital form and plot the resultant data on a chart which depicts the rate of drilling penetration in graphical form. The computer comprises a printer which will produce hard copies on, any desired scale, of the resultant graphical data. A video display is also functionally connected to the computer in order to provide real-time visual display to the user of the system, thereby facilitating an accurate appraisal of the type and quality of the formation being drilled through while the drilling process is transpiring. The advantanges of the present invention are basically as follows:

1. The programmed computer of the present system records the depth for every foot, or any other preselected interval, which the wellbore has been drilled on the graphical output, thereby making said data much easier to interpret than is possible with the systems of the prior art, as these systems generally provide a single, handwritten number at the top of the chart as the only indication of the depth which corresponds to the graphical data being charted;

2. The present system does not record anything when drilling is not occurring, whereas most of the systems of the prior art continuously operate whether drilling is occuring or not, thereby distorting the graphical data which is recorded with improperly correlated data, thereby rendering the data very difficult to properly interpret;

3. The present system provides an electronic circuit which filters and shapes the electronic pulse so as to eliminate any and all irrelevant electrical signals;

4. The present invention has a built-in capability of recording, on several scales, the rate of penetration of the drill pipe on a real-time basis;

5. The accuracy of the graphical output exceeds that presently known in the relevant art;

6. The system provides an accurate continuous log whereas prior systems provided a 24 hour chart that was very difficult to correlate.

7. The present invention is compact, easy to install and use, and much more cost-effective than the relevant prior art;

8. The present invention features an interface modem which can be plugged into the computer to functionally connect the system to a telecommunications system in order to telecommunicate the hard-copied graphical output to any desired location, where the data can be utilized by investors, bankers, engineers, technicians, supervisory personnel, geologists, and any other person who may benefit from knowing the rate of penetration of the drill bit through the formation, in order to properly appraise the quality of the formation and its probability of containing oil and/or gas;

9. This system has proved to be a functional unmanned instrument, capable of producing inexpensive, highly accurate, correlatable logs in six different formats and two different colors;

10. Installation and program initiation can be performed by non-computer personnel.

11. Actual service and diagnosis can be performed quickly by means of a telephone call and corresponding use of the drilling data computer's built in two-button self-test feature.

12. Control functions can also be an output of this system, to control valves lights, alarms, additional recorders, and controls for shutting down systems.

13. The present invention provides a real-time readout of the well log which can be utilized while drilling to correct errors or to properly diagnose the type and the quality of the formation being drilled. It provides a real-time basis for making real-time alterations to the composition of the drilling fluids being circulated through the well bore. By knowing the penetration rate on a real-time basis, supervisory personnel and operational technicians, other personnel can make real-time adjustments to the type of drilling bit being utilized to drill through the formation. Real-time adjustments can be made to the direction of drilling by making a real time determination of the proper point at which to begin the drilling off of the longitudinal axis, i.e., choosing the right sediment/strata to make the first adjustment off of the vertical axis of drilling.

The devices of the prior art are plagued with the problem of generating output which is unreadable by ordinary technicians and workers in the field who cannot accurately interpret the data plotted by the device, as these devices do not provide an output which is calibrated according to the depths at which the measurements correspond to the prior art devices also produce an output regardless of whether the drilling process is interrupted or not. This makes the resultant graphical output generated by the devices very diffcult to interpret by anyone, even skilled personnel. The present invention also has the built-in capability of recording on various scales, by means of the operator of the device merely pressing buttons on the computer terminal, which is conveniently accessible, and the computer automatically makes the adjustment by means of said computer program to produce an output on the selected scale, thereby making the data much easier to interpret on a real-time basis. The devices of the prior art would require one machine for each scale desired, and not only is this expensive, it is very diffult to manage. The device of the present system is much less expensive, easier to install, easier to maintain, and easier to operate, even by an ordinary workman in the field, whereby the real-time graphical output generated by the device of the present invention facilitates optimal drilling of the well bore. The computer program ensures that the graphical output provides a constant time frame reference with respect to the measurement of drilling rate of penetration being continuously recorded on a real-time basis, and further, provides a readout of the depth at every 100 ft. interval or any other interval desired, thereby facilitating accurate and easy interpretation of the graphical data.

The present invention reduces the incidence of downhole wireline operations, which are expensive, require removal of the drill string, which results in rig downtime, eliminates the necessity of contracting with an outside wireline company, and eliminates the necessity of dependence on the accuracy of the equipment and data generated by the equipment utilized in downhole wireline recording operations, such as gamma ray recorders and beta ray recorders. In the context of wireline operations, it is necessary to have a human being, a log analyst, accurately interpret the information being recorded by the gamma ray or whatever type of detector is being utilized. The present invention eliminates this log analyst from the chain of the information gathering process. The present invention could possibly eliminate the necessity of a mud logger continuously working on the rig during the drilling procedure, on a 24-hour basis, which thereby eliminates the substantial cost thereby incurred and human error inherent thereto.

Therefore, in summary, the present invention provides a system for continuously and accurately recording on a real-time basis, the rate of drilling penetration, and which ultimately provides graphical data which can be easily interpreted and utilized for monitoring the drilling process on a real-time basis, thereby facilitating the modification of the drilling process commensurate with the type of formation being drilled. The invention eliminates much of the costs and human error presently attendant to oil rig operations, with the devices of the prior art. Also, it is important to note that the system of the present invention is unaffected by rig power, which has resulted in the failure of many of the devices of the prior art in crucial situations. The programmed computer of the present invention is designed to continuously monitor the shape of, duration of, and any other critical data relevant to, the AC pulse generated by the electrical apparatus situated on the oil rig for powering the oil rig, for any deviations or interruptions thereof. The machines of the prior art, which do not continuously monitor this phenomenon can inaccurately record the data, whereby the computer program of the present invention, upon sensing this phenomenon, makes the necessary adjustments for ensuring an accurate graphical output. Also, the present invention provides a magnetic tape storage system for collecting all of the generated data for future use. Further, the present invention provides a video display screen for displaying the graphical output generated on a real-time basis, to facilitate easier real-time utilization of the data for montioring the drilling as above described.

DETAILED DESCRIPTION OF THE PREFERRED EMBODIMENT

Figure 1:
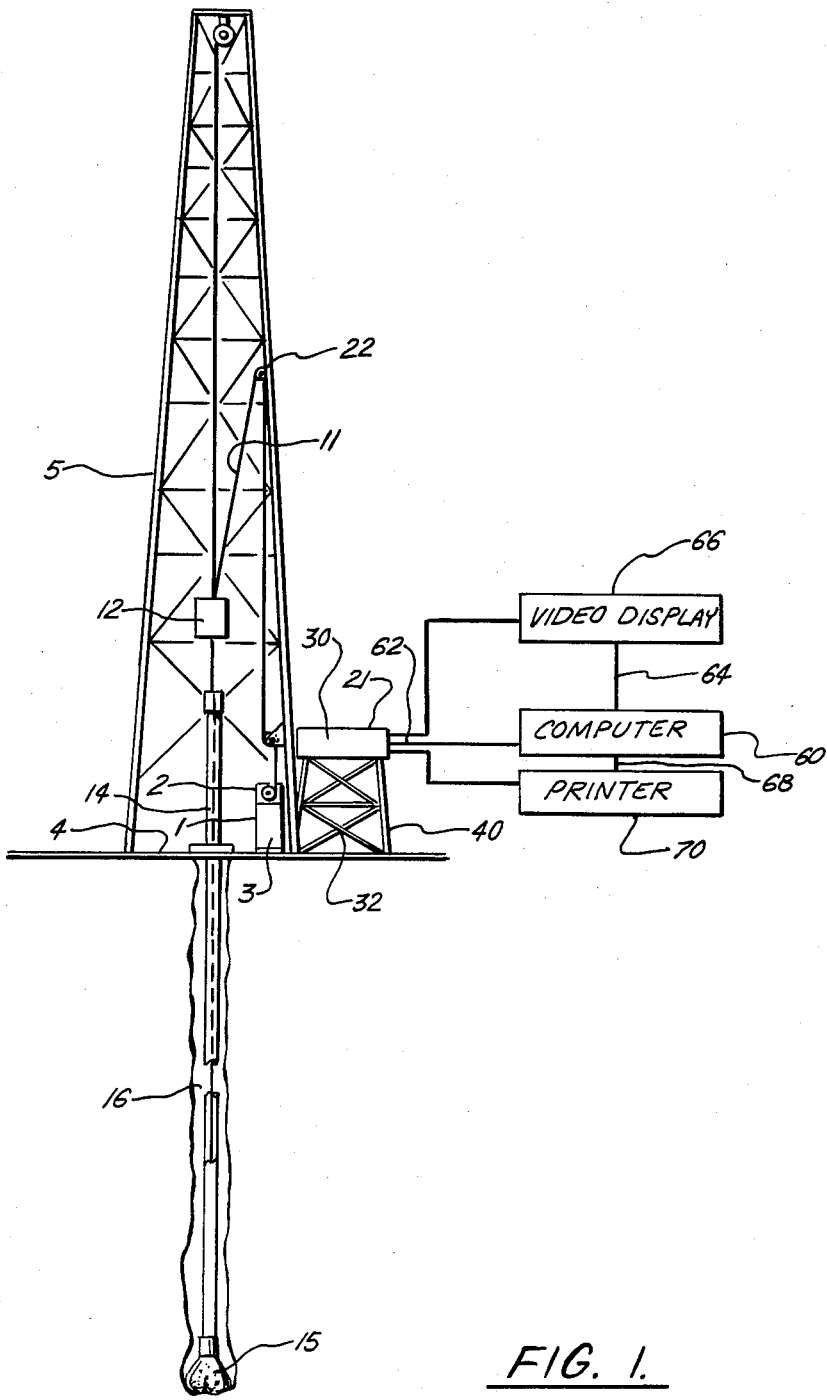
FIG. 1 is an overall, partly schematic view of the entire apparatus of the present invention deployed in the context of an oil well drilling operation.
Figure 3:
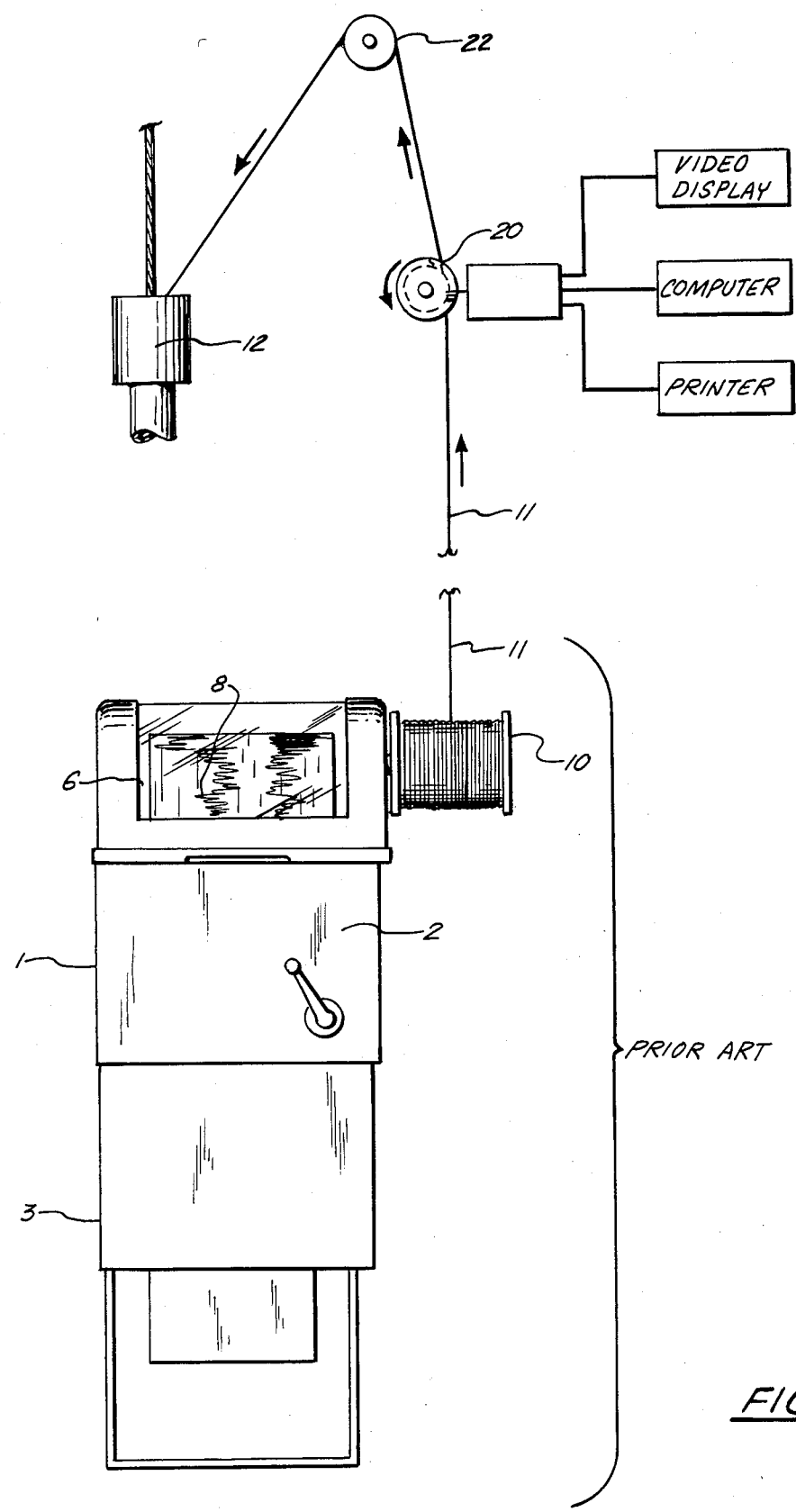
FIG. 3 is a frontal, elevational view of the continuous drill rate logger, the reeled wire, and the pulley wheel guiding mechanism of the present invention, depicting its functional interrelationship with the remainder of the apparatus of the present invention, which is shown in schematic form.

Referring now to FIG. 1, the preferred embodiment of the present invention, in one of its aspects, comprises a standard drilling recorder, referenced generally by the numeral 1, such as is manufactured by Totco and others. The recorder 1 standardly comprises an enclosure 2, mounted on a stand 3, which is generally mounted to the floor 4 of the oil rig 5. A generally cylindrical drum 6, as best seen in FIG. 3 is rotatably mounted within enclosure 2 of recorder 1, wherein a strip of graph paper 8 is circumferentially mounted to drum 6. Further, a wire-carrying reel 10 is revolvably mounted to enclosure 2 of recorder 1, wherein the end of the wire 11 carried by reel 10 is connected to the swivel 12 of the oil rig 5, and wherein reel 6 is functionally connected to a suitable marking device, such as a pen (not shown), so that for each predetermined distance of downward movement of the rig's /kelly and thus the drill string 14 and drill bit 15, which are attached thereto within the wellbore 16 being drilled, a suitable mark is made on the graph paper 8, so that a chart of the rate of drilling penetration is continuously logged. The above-described recorder representative of the state of the art of continuous real-time drilling rate measurers/recorders, which permit recordation of the drilling rate of penetration without the necessity of interrupting the drilling operation.

Figure 2:
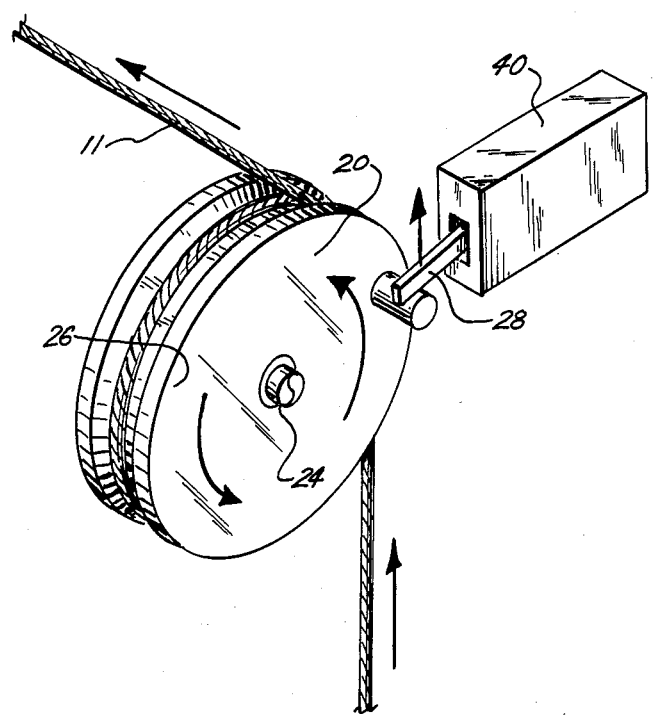
FIG. 2 is an isolated isometric view of the measuring wheel and/first cam of the apparatus of the present invention.

The present invention, in its principle aspects, as indicated generally by the numeral 21 in FIG. 1, is functionally connected to CDR logger 1, or any other suitable wire-reeling/unreeling apparatus, as will hereinafter become obvious. As shown in FIG. 2, the present invention comprises a 2 lobe (TOTCO) or 4 lobe (Geolograph) wheel 20 positioned in the recorder, attached to the clutched side of a shaft that is driven by the recorder's external measuring wheel. One embodiment of wheel 20 is grooved to receive wire 11 being reeled by wire-carrying reel 10, which is looped at least one time around measuring wheel 20; wire 11 then travels over pulley wheel 22 located within oil rig 5 somewhere above measuring wheel 20, wherein wire 11 then proceeds downwardly to swivel 12 of oil rig 5, to which it is functionally connected. Measuring wheel 20, as best seen in FIG. 2, comprises a first cam 24 on one side 26 thereof. First cam 24 is positioned on measuring wheel 20, so that for each revolution of measuring wheel 20, cam 24 thereof will engage switch 28 of filtering/shaping unit 40, as will hereinafter be discussed.

Filter/shaping unit 40 preferably comprises, as best seen in FIG. 1, a second enclosure 30 supported by stand 32, which is preferably mounted to the floor 4 of the oil rig 5, and internal electronic/electrical circuitry, including filter/shaping unit 40. Filter/shaping unit 40 is functionally connected to a computer 60 mounted to floor 4 of oil rig 5 adjacent thereto, by means of a suitable interface 62.

In operation, rig mechanical power (not shown) is utilized to actuate drilling recorder 1, which causes wire-carrying reel 10 to unreel wire 11 therefrom, whereby wire 11 is then looped around measuring wheel 20, wire 11 traveling upwardly therefrom over pulley wheel 22 and down to swivel 12 of oil rig 5, to which it is functionally connected. First cam 24 provided on measuring wheel 20 is positioned so that for every preselected downward movement of rig's kelly and swivel 12, and therefore drill string 14 and drill bit 15 attached thereto for drilling wellbore 16, for example, every one foot, cam 24 will engage switch 28 of filtering/shaping unit 40, thereby closing circuitry, and causing an electrical pulse to be transmitted therethrough. Said electrical pulse is filtered and shaped by filtering/shaping unit 40, into a usable signal to be processed by computer 60 which is specially programmed to process this like signal into utilizable digital data.

The computer program processes the data and displays the data, on the video display 66 and/or by hard-copying it via printer 70, in a graphical form which accurately depicts the rate of penetration of the drill string and drill bit within the wellbore. The graphical output also provides a reading of the depth of penetration at any preselected interval, for example, every 100 feet. Also, the program enables the user to merely press the appropriate button on the computer terminal 62 to convert the scale of the graphical output to any desirable scale, thereby enabling the utilization of the graphical output by field personnel, in order for them to more easily and accurately interpret and correlate the data. It is important to note that a second cam (not shown) is provided on measuring wheel 20 on the opposite side of first cam 24 which actuates the circuit switch 28, and is positioned to prevent chattering of the first cam 24 on the switch 28, thereby preventing the possibility of more than one electrical signal being conveyed through the electrical circuitry for each preselected distance of penetration of the kelly and drill string. It should be noted that when the drilling stops, the computer program causes the computer 60 to automatically stop, thereby ensuring a more accurate and direct correspondence of graphical output with the depth of the formation being drilled, so that a determination of the quality and type of the formation at each easily identified depth can be had.

Further, the computer 60 operates on an uninterruptable power supply source, wherein the computer 60 comprises an internal mechanism (not shown) which, upon sensing the occurrence of the condition wherein the rig power is interrupted or is malfunctioning, automatically actuates a static transfer switch (not shown) which automatically transfers the computer load to batteries (not shown), thereby resulting in continuous operation of the computer 60, thereby ensuring that the graphical output will not be adversely affected by the efficiency of the rig power, which has resulted in the failure of many of the devices of prior art.

Four special function keys on the computer terminal of the computer are the only mechanisms which are necessary in order to properly operate the system of the present invention. No manual input other than print command, footage addition and subtraction, and selection of the desired scale for the graphical output, need be made. A continuous visual display is provided on the video display screen, on a real-time basis, thereby providing a real-time drill rate graph which can be utilized to monitor the drilling process. The graphical output displayed on the video screen can be printed into a hard-copy log by merely depressing the appropriate key on the terminal keyboard, which will cause the computer to print a hard copy log on this command.

The graphical output, whether on the video screen or on hard copy, provides an accurate depiction of the rate of drilling penetration, on any desired scale, which scale can be easily adjusted by means of merely depressing the appropriate key on the terminal key board, as the computer program automatically translates the graph into the appropriate scale. The graphical output also provides an accurate and constant time frame reference and also continuously records the depth at any preselected interval, for example, every 100 feet. Therefore, the graphical output generated by the system of the present invention provides a continuous and accurate graphical display of the drilling rate of penetration in feet per hour, for example, and provides a depth reading for every 100 feet, for example, thereby providing a real-time output which is easily readable and interpretable, and which is very accurate, due to the computer program taking into account all variables which affect the rate of drilling penetration, the fact that the computer is not dependent on rig power, and the fact that the computer program provides an internal mechanism which ensures against false interruptions of the system of the present invention.

What is claimed is:

1. A method for continuously and spontaneously logging the drilling progress of a well during drilling operations, comprising the steps of:
   a. periodically measuring the downwardly extensible travel of a kelly or similar downwardly extending drive;
   b. interactively, periodically and simultaneously performing the steps including:
      i. detecting the presence of motion of said kelly or drive indicating drilling activity;
      ii. detecting downward extensible motion of said kelly or drive;
      iii. calculating the cumulative downward distance of extensible motion of said kelly or drive;
      iv. calculating the rate of said extensible motion per unit of time during which said drilling activity occurs;
      v. automatically inputting said rate and said distance into a computer; and
      vi. utilizing said computer, continuously and spontaneously plotting said rate versus said distance as said kelly or drive travels downward.

2. A method for continuously and spontaneously logging the drilling progress of a well during drilling operations according to claim 1, further comprising the step of periodically printing a plot of said rate versus said distance.

3. A method for continuously and spontaneously logging the drilling progress of a well during drilling operations according to claim 1 so as to provide a spontaneous and continuous record of said plot.

4. A method for continuously spontaneously logging the drilling progress of a well during drilling operations according to claim 1, wherein said steps of calculating are performed by said computer.

* * * * *